Dec. 21, 1965  E. GÖTZ  3,225,182
DIGITAL CURVE COMPUTER FOR USE IN CONTROLLING
THE PATH OF A WORK TOOL OR WORK PIECE
Filed March 22, 1962  3 Sheets-Sheet 1

*Inventor:*
Elmar Götz
By: George K. Spencer
Attorney

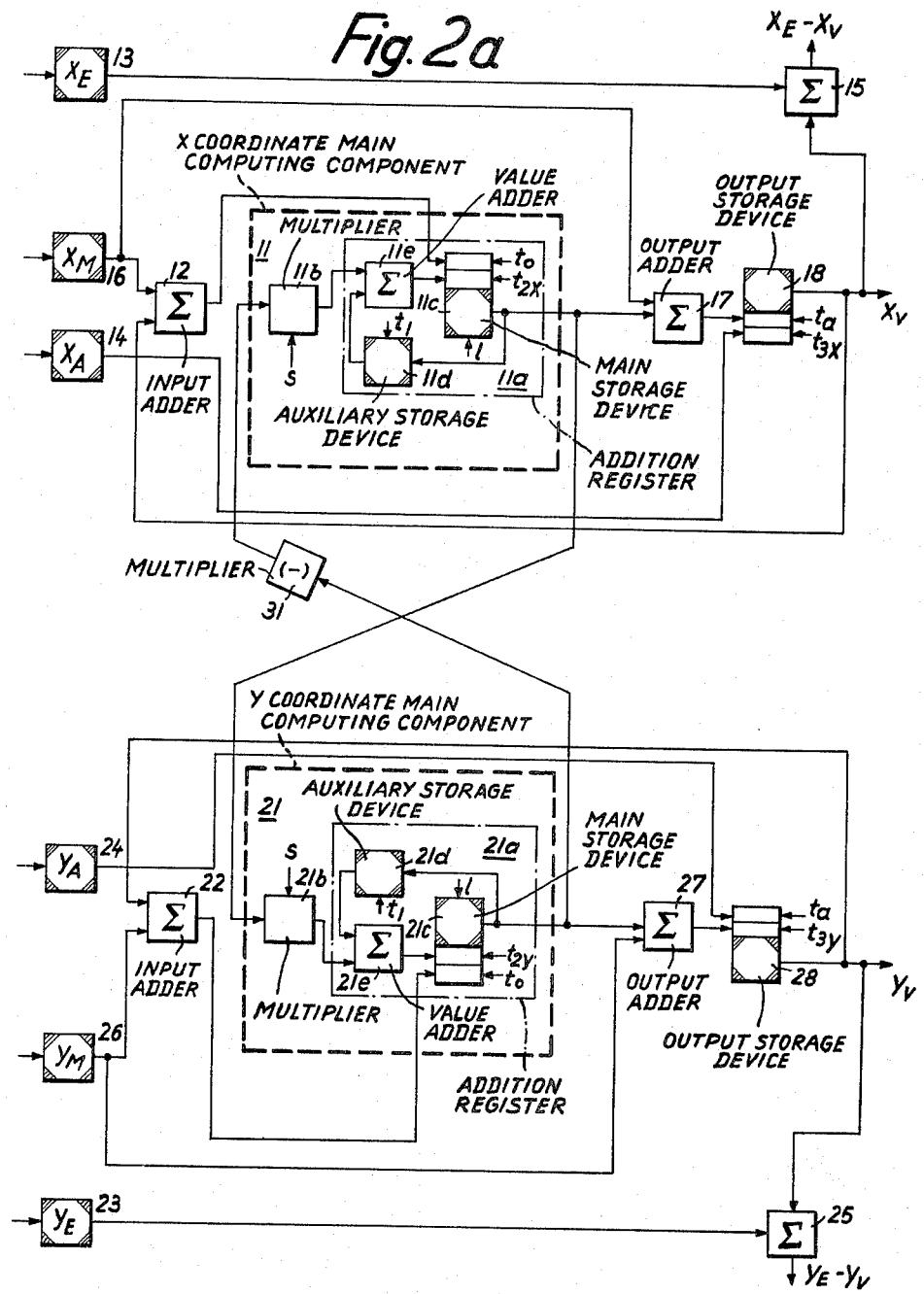

United States Patent Office 3,225,182
Patented Dec. 21, 1965

3,225,182
DIGITAL CURVE COMPUTER FOR USE IN CONTROLLING THE PATH OF A WORK TOOL OR WORK PIECE
Elmar Götz, Hattenheimer Str. 15,
Berlin-Frohnau, Germany
Filed Mar. 22, 1962, Ser. No. 181,685
Claims priority, application Germany, June 29, 1961,
L 39,395
8 Claims. (Cl. 235—164)

The present invention relates to a digital computer.

More particularly, the present invention relates to an improvement of the arrangement disclosed and claimed in copending application Serial No. 78,574, filed December 27, 1960, by Heinz Günter Lott, Elmar Götz, and Peter Boese, now Patent No. 3,109,092, issued October 29, 1963. The arrangement of the earlier application involves a digitally operating computer which has the characteristic data of a curve, composed of rectilinear and/or circular portions, fed into it and which continually computes points along the curve which are sufficiently close to each other to allow the curve to be followed. All of the positions of the digital number representing the coordinates $x_\nu$ and $y_\nu$ of a calculated point $P_\nu$ along the curve appear in synchronism and simultaneously at the output of the computer and, after a time interval depending on the clock pulse frequency $f_t$ at which the computer is set to operate, are replaced by the data pertaining to the next point along the curve. Such an arrangement may be used, for example, for controlling the path along which the tool of a machine tool moves with respect to a work piece, or the path along which the work piece is moved relative to the work tool.

The computer arrangement disclosed in application Serial No. 78,574 is able to compute the coordinates of only those curves which are composed of rectilinear or circular arcuate portions, or of curves which can be approximated by such portions. The characteristic curve data includes the starting and end points of the rectilinear portions and the starting and end points as well as the center of each circular curve portion, and the manner in which the computer operates for calculating the points along rectilinear curve portions differs from the manner of operation involving circular curve portions.

The basic objects of the present invention, and the particular manner in which they are achieved, will be best understood by referring to the accompanying drawings, in which:

FIGURE 2a is a schematic diagram showing a variation of the embodiment of FIGURE 2.

Figure 1:
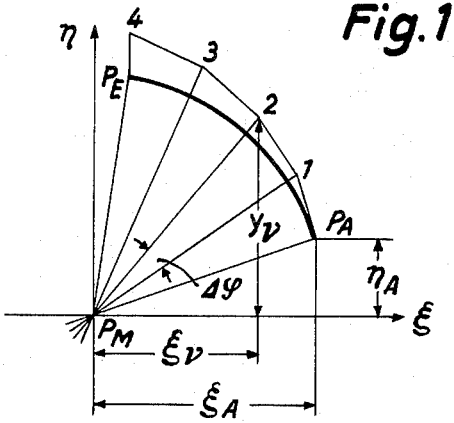
FIGURE 1 is a plot of a circular curve portion the coordinates of whose points are to be calculated by a computer of the present invention.

The present invention relates mainly to the circuitry by means of which the computer is able to calculate the coordinates of points along a circular curve portion. To facilitate an understanding of this, there will first be described the manner in which the arrangement according to application Serial No. 78,574, operates in order to calculate the coordinates of points along such a circular curve portion, i.e., a curve portion which is part of a circle. In essence, the computer operates according to the following two equations:

$$x_\nu - x_M = \zeta_A - \sum_0^{\nu-1} \eta \nu K$$

$$y_\nu - y_M = \eta_A + \sum_0^{\nu-1} \zeta \nu K$$

where $\zeta_A$ and $\eta_A$ represent the coordinates of a starting point $P_A$ in a coordinate system $(\zeta, \eta)$ having its origin at the center $P_M$ of the circular curve portion, as shown in FIGURE 1. The factor K represents the computer constant which is sufficiently small so as to obtain the necessary resolving power. Mathematically, the constant K represents, during the calculation of a circular portion, the ratio of the circular segment between two points along the curve to the radius, i.e., the constant K repersents the angle $\Delta\phi$ formed between two radii of the circle passing, respectively, through the two points.

FIGURE 1 shows a circular curve portion which is traversed in four steps. The number of steps has been kept so small solely to facilitate illustration and explanation, it being understood that, in practice, the number of steps required to traverse a circular curve portion subtending the angle which the illustrated curve portion $P_A - P_E$ subtends will be much larger. The formulas according to which the computer operates while computing the points along a circular portion will not be exact but be only an approximation. This can be seen from the fact that the point 4 does not coincide precisely with point $P_E$. What actually happens is that, beginning with point $P_A$, the path which is followed is a tangent to the circle, this tangent being traversed until the angle $\Delta\phi$ has been covered; the first segment will thus end at point 1. From there, the next segment is traversed, albeit in a shifted tangent, until the point 2 is reached, and so on. It will be appreciated, therefore, that the above equations are not exact but represent limit conditions, the path which is actually followed being not truly circular but polygonal.

It is, therefore, an object of the present invention to provide an improved arrangement of the above type in which the errors incurred during the computation of the coordinates along circular curve portions are reduced, and, with this object in view, the present invention provides that the calculation of the points along a circular curve portion is based on the following limit equations:

$$x_\nu = x_M + \zeta\nu = x_M + \zeta_A - \sum_0^{\nu-1}\left(\eta\nu + \zeta\nu\frac{K}{2}\right)K \quad (1)$$

$$y_\nu = y_M + \eta\nu = y_M + \eta_A + \sum_0^{\nu-1}\left(\zeta\nu - \eta\nu\frac{K}{2}\right)K \quad (2)$$

For calculating the coordinate $x_{\nu+1}$, the following is done in the sequence indicated:

(1) The coordinates of the preceding point are transferred to the main and auxiliary registers of two addition registers.

(2) The value $\zeta_\nu K/2$ is formed via a multiplication element and applied to the addition register pertaining to the $y$ coordinate.

(3) The output value $\eta_\nu + \zeta_\nu K/2$ of the addition register is multiplied, via a multiplication element, by $-K$ and is applied to the addition register pertaining to the $x$ coordinate.

(4) The value $\zeta_\nu - (\eta_\nu + \zeta_\nu K/2)K$ is applied to the storage device.

(5) The value in the storage device as well as the coordinate of the center point $x_M$ are applied to a summation element, at whose output appears the coordinate $x_{\nu+1}$.

After the coordinate $x_{\nu+1}$ has been calculated, the coordinate $y_{\nu+1}$ is calculated by carrying out the following sequentially:

(1) The numbers stored in the main storage devices of the addition register are cleared and the value $\eta_\nu$ contained in the auxiliary storage device is transferred to the main storage device of the addition register pertaining to the $y$ coordinate.

(2) The output value $\eta_\nu$ of the addition register is multiplied, via another multiplication element, by $-K/2$ and, together with the value $\zeta_\nu$ in the auxiliary storage device for the $x$ coordinate, is transferred to the main storage device of the addition register pertaining to the $x$ coordinate.

(3) The output value $\zeta_\nu - \eta_\nu K/2$ of the addition register is multiplied, via a multiplication element, by K and applied to the addition register pertaining to the $y$ coordinate.

(4) The value $\eta_\nu + (\zeta_\nu - \eta_\nu K/2)K$ appearing at the output of the addition register is applied to a storage device.

(5) The last-mentioned value of the storage device as well as the coordinate $y_M$ of the center point $P_M$ are applied to a summation element, at whose output appears the $y_{\nu+1}$.

One embodiment of the present invention, and its operation, will be explained with reference to FIGURE 2, which is basically similar to the arrangement shown in FIGURE 5 of application Serial No. 78,574, in which the computer is connected to calculate the point along a circular curve portion. Thus, parts 14 and 24 contain the $x$ and $y$ coordinates of the starting point $P_A$, parts 13 and 23 the coordinates of the end point $P_E$, and parts 16 and 26 the coordinates of the center point $P_M$. The difference values $(x_A - x_M)$ and $(y_A - y_M)$ are formed in the summation components 12 and 22, hereinafter referred to as input adders. These differences are fed to the addition registers 11a and 21a of the main computing components 11 and 21, pertaining to the $x$ and $y$ coordinates, respectively. The output value $\eta_\nu$ of the main computing component 21 is multiplied by $(-1)$ in a multiplication element 31, and the output of element 31 is multiplied by K or $K/2$, as will be described below, in the element 11b of the main computing component 11. The elements 31 and 11b together constitute a controlled multiplier for multiplying by the factor $-K$ or $-K/2$.

The positive of the output of the main computing component 11 is multiplied by the factor K or $K/2$, in the multiplier 21b of the main computing component 21. With each beat or clock pulse $t$, the numbers in the multipliers 11b and 21b are added to the numbers already stored in the addition registers 11a and 21a. The numbers $\zeta_\nu$ and $\eta_\nu$ accumulated in the addition registers, without their lower digits which would surpass the resolving power as determined by the size of the raster units, are added to the coordinates $x_M$ and $y_M$ of the center point $P_M$ in summation circuits 17 and 27, hereinafter referred to as output adders, the outputs of which are fed to the output of the computer.

The differences $(x_E - x_\nu)$ and $(y_E - y_\nu)$ are formed by the summation components 15 and 25, which serve to determine the instant at which the calculation of the particular curve portion is terminated. However, due to the error which arises, as shown in FIGURE 1, these two difference values will not reach zero at the same time. Thus, only one of these two difference values is used to control the termination of the calculation of the particular curve portion. The difference value which will be utilized will be the one which, for the end point that was reached, such as point 4 of FIGURE 1, has the lesser error in the inaccurate coordinate. This depends on the slope of the tangent through the end point and is determined when the data for the particular curve portion is given.

Figure 2:
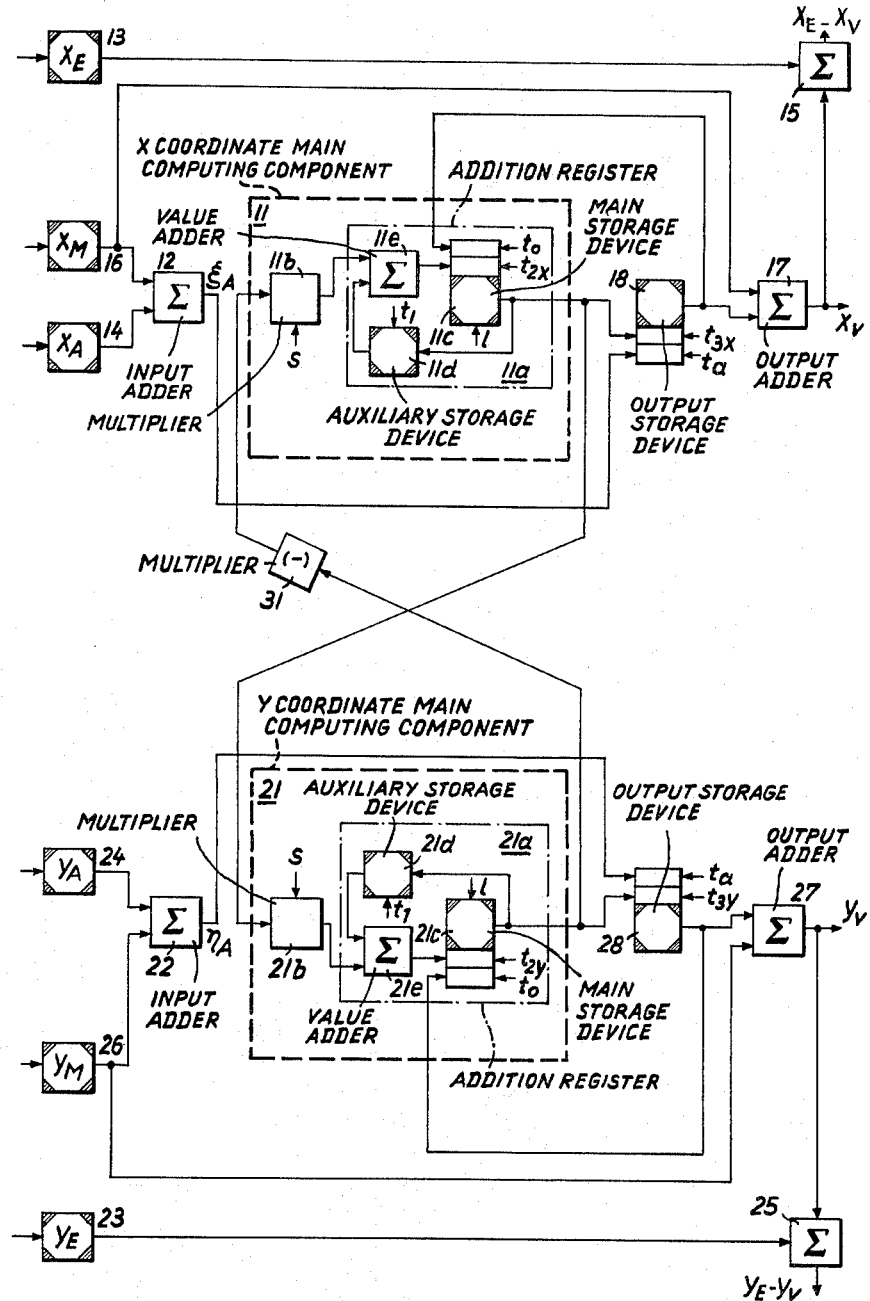
FIGURE 2 is a schematic diagram of a computer according to the present invention.

The circuitry shown in FIGURE 2 differs from that of FIGURE 5 of application Serial No. 78,574 in that the addition registers 11a and 21a are shown as incorporating individual component parts by means of which the present invention is realized, namely, main storage devices 11c, 21c, auxiliary storage devices 11d, 21d, and summation circuits, or value adders, 11e, 21e. Also, the circuit of FIGURE 2 incorporates storage devices 18 and 28 to which the values $\zeta_a$ and $\eta_a$ are applied when the points of a circular curve portion are begun to be calculated as the result of a clock pulse $t_a$.

For purposes of explanation, it will be assumed that the coordinates $x_\nu$ and $y_\nu$ of a point along a circular curve portion are present at the output of the computer, namely, the outputs of the adders 17 and 27, and that the coordinates $x_{\nu+1}$ and $y_{\nu+1}$ of the next point $P_{\nu+1}$ are now to be calculated. This calculation is then carried out in the following manner:

(1) Upon the occurrence of a clock pulse $t_0$, the values $\zeta_\nu$ and $\eta_\nu$ contained in the output storage devices 18 and 28 are transferred to the main storage devices 11c and 21c of the addition registers 11a, 21a.

(2) At the next clock pulse $t_1$, the values $\zeta_\nu$ and $\eta_\nu$ are transferred from the main storage devices 11c and 21c to the auxiliary storage devices 11d and 21d.

(3) The multipliers 11b and 21b multiply the values fed into them either by K or $K/2$. The multiplication is carried out by the factor $K/2$ if there is a command signal $s=L$ applied to the circuits. If $s=0$, the multiplication is carried out by a factor K. The command signal $s$ then assumes the value L, so that the output values $\zeta_\nu$ and $\eta_\nu$ of the addition registers 11a and 21a are multiplied by $K/2$ and $-K/2$ (due to the interposed multiplier 31), respectively. For the moment, however, only the multiplication carried out by the multiplier 21b is of interest, namely, the multiplication of $\zeta_\nu$ by $K/2$. At the output of the adder 21e there will then appear the value $$\eta_\nu + \zeta_\nu K/2 \qquad (3)$$

(4) At clock pulse $t_{2y}$, the value according to Equation (3) is transferred to the main storage device 21c.

(5) The command signal $s$ disappears, so that the output of the addition register 21a is multiplied first by $(-1)$ in the multiplier 31 and then by K in the multiplier 11b, so that the value $$-(\eta_\nu + \zeta_\nu K/2)K \qquad (4)$$

appears at the output of the multiplier 11b. Inasmuch as the value $\zeta_\nu$ is stored in register 11d, the output of the adder 11e will be $$\zeta_\nu - (\eta_\nu + \zeta_\nu K/2)K \qquad (5)$$

(6) At clock pulse $t_{2x}$, the value according to Equation (5) is transferred to the main storage device 11c.

(7) At clock pulse $t_{3x}$, the value according to Equation (5) appearing in the addition register 11a is transferred to the output storage device 18. The output of storage device 18 is applied to one input of the output adder 17, whose other input has the coordinate $x_M$ of the center of the circular curve portion applied to it. The output of adder 17 will thus be $$x_{\nu+1} = x_M + \zeta_\nu - (\eta_\nu + \zeta_\nu K/2)K \qquad (6)$$

(8) The values in the main storage devices 11c and 21c are cleared by a pulse L.

(9) At clock pulse $t_{2y}$, the value $\eta\nu$ contained in the intermediate storage device 21d is transferred to the main storage device 21c.

(10) The value $s$ then becomes L, so that output value $\eta\nu$ of the addition register 21a, after being multiplied by (−1) in multiplier 31, is multiplied by $K/2$ by multiplier 11b. Thus, there will appear at the output of summation circuit 11e the value $$\zeta\nu - \eta\nu K/2 \qquad (7)$$

(11) At clock pulse $t_{2x}$, the value of Equation (5) is applied to the main storage device 11c.

(12) The value of $s$ then becomes 0, so that output value 5 of the addition register 11c is multiplied by K in multiplier 21b.

$$(\zeta\nu - \eta\nu K/2)K \qquad (8)$$

Thus, there is obtained at the output of adder 21e the value $$\eta\nu + (\zeta\nu - \eta\nu K/2)K \qquad (9)$$

(13) At clock pulse $t_{2y}$, the value according to Equation (9) is transferred to the main storage device 21c.

(14) At clock pulse $t_{3y}$, the value according to Equation (9) of the addition register 21a is transferred to the output storage device 28. The output of storage device 28 is applied to one input of the output adder 27, whose other input has the coordinate $y_M$ of the center of the circular curve portion applied to it. The output of adder 27 will therefore be $$y_{\nu+1} = y_M + \eta\nu + (\zeta\nu - \eta\nu K/2)K \qquad (10)$$

The operation for calculating the coordinates $x_{\nu+1}$ and $y_{\nu+1}$ is now completed.

The fact that the formulas representing the coordinates are identical to Equations 1 and 2, respectively, can easily be proved by substituting, in Equation (10), the value $\eta\nu$ according to Equation (2):

$$y_{\nu+1} = y_M + \eta_A + \sum_0^{\nu-1}\left(\zeta\nu - \eta\nu\frac{K}{2}\right)K + \left(\zeta\nu - \eta\nu\frac{K}{2}\right)K$$

which can be simplified to $$y_{\nu+1} = y_M + \eta_A + \sum_0^{\nu}\left(\zeta\nu - \eta\nu\frac{K}{2}\right)K \qquad (11)$$

Equation (11) is identical to Equation (10).

The arrangement which, according to the present invention, operates according to the approximation Equations (1) and (2) can be varied in different ways. As shown, for example, in FIGURE 2a, the storage devices 18 and 28 can be connected after the adders 17 and 27. In that case, the values $x_A$ and $y_A$ of the storage devices 14 and 24 would not be applied to the input adders 12, 22, respectively, but to the storage devices 18, 28, respectively, whereas the feedback from the storage devices 18, 28, would be connected to the now-open inputs of adders 12, 22, respectively, whose outputs, in turn, would no longer be connected to the storage devices 18, 28, but to the main storage devices 11c, 21c, respectively, of the addition registers. Thus, the arrangement of FIGURE 2a differs from that of FIGURE 2 in that the main storage devices have not just the values $\zeta\nu$ and $\eta\nu$ but the values $x_M+\zeta\nu$ and $y_M+\eta\nu$ applied to them at $t_0$, and that already the inputs of the storage devices 18, 28, will have been augmented by the values $x_M$, $y_M$. This means that the computing components 11, 21, will process the values increased by the coordinates of the point $P_M$.

Figure 3:
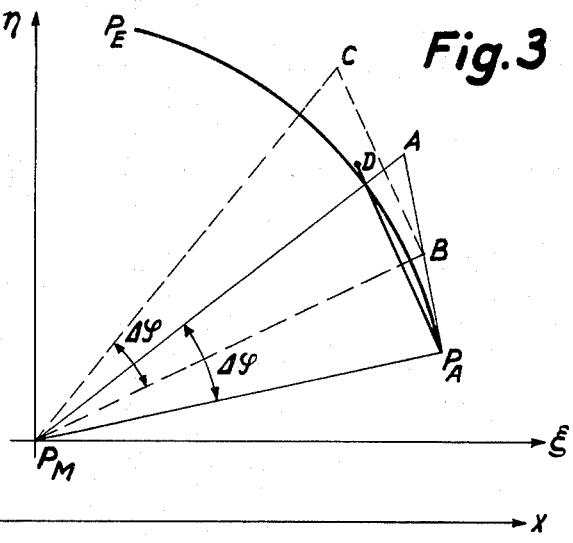
FIGURE 3 is a plot showing the operation of the computer according to the present invention.

FIGURE 3 shows how the arrangement according to the present invention increases the accuracy with which the coordinates of a circular curve portion are calculated. For the sake of clarity, the relationship between the various lengths is shown even more exaggeratedly than was the case in FIGURE 1; also, only the operation going from the starting point $P_A$ to the first intermediate point is shown. At first, the point is calculated according to the approximation Equations (1) and (2), as is also the case in the arrangement shown in application Serial No. 78,574, i.e., the path goes from point $P_A$ along the tangent until it reaches point A which is obtained after the angle $\Delta\varphi$ has been swept. In the arrangement according to application Serial No. 78,574, it is this point A which is the first intermediate point. According to the present invention, the first intermediate point is located more accurately in that the distance $\overline{P_A A}$ is halved, whereupon, beginning at point B, the path is calculated along a new tangent until the angle $\Delta\varphi$ has again been swept, so that the point C is reached. The distance $\overline{BC}$ is then displaced so as to assume a new position in which the line BC is parallel to its original position but has its starting point B coincide with the actual starting point $P_A$ of the curve portion. The thus-displaced distance intersects the curve portion at that point at which the radius $P_M A$ intersects the curve. The end point of the displaced length BC is indicated at D, and represents the starting point of the calculation of the next intermediate point; in the arrangement according to application Serial No. 78,574, it is from point A that calculation of the next intermediate point proceeds. It will be appreciated that the extent to which the point D is in error, with respect to the actual curve portion, is substantially less than the extent to which the point A is in error. As a result, the arrangement according to the present invention will, without requiring substantially more complicated circuitry, calculate the coordinates along a given circular curve portion appreciably more accurately than the arrangement described in the earlier application.

It will be understood that the above description of the present invention is susceptible to various modifications, changes, and adaptations, and the same are intended to be comprehended within the meaning and range of equivalents of the appended claims. For instance, in addition to the modified circuit arrangement involving the connection of the output storage devices 18 and 28, the timing of the operation may be such that the calculations affecting the $y$ coordinate may be carried out ahead of those affecting the $x$ coordinate.

What is claimed is:

1. A digital computer for computing the coordinates $x_\nu$, $y_\nu$, of points $P_\nu$ along a circular curve portion having a known starting point $P_A$, end point $P_E$ and center $P_M$, the coordinates of which center point $P_M$ are $x_M$, $y_M$, said computer calculating said cordinates in accordance with the following equations:

$$x_\nu = x_M + \zeta\nu = x_M + \zeta_A - \sum_0^{\nu-1}\left(\eta\nu + \zeta\nu\frac{K}{2}\right)K$$

$$y_\nu = y_M + \eta\nu = y_M + \eta_A + \sum_0^{\nu-1}\left(\zeta\nu + \eta\nu\frac{K}{2}\right)K$$

wherein $\zeta$, $\eta$, is a coordinate system having as its origin said point $P_M$, wherein $\zeta_A$, $\eta_A$, are the coordinates of said starting point $P_A$ in said coordinate system $\zeta$, $\eta$, wherein $\zeta_\nu$, $\eta_\nu$, are the coordinates of the points $P_\nu$ in said coordinate system $\zeta$, $\eta$, and wherein K is a multiplying factor, said computer comprising, in combination:

(1) a first controlled multiplier for multiplying by the factor −K or −K/2;
(2) a second controlled multiplier for multiplying by factor K or K/2;
(3) a first main storage device;
(4) a second main storage device;
(5) a first auxiliary storage device;
(6) a second auxiliary storage device;
(7) a first output storage device;
(8) a second output storage device; and
(9) a first output adder;

said computer further comprising:
(a) first means for applying the coordinates $\zeta\nu$, $\eta\nu$, of a previous point and stored in said first and second output storage devices to said first and second main storage devices, respectively, as well as to said first and second auxiliary storage devices, respectively;
(b) second means for thereafter applying the output of said first main storage device to said second controlled multiplier, for causing the same to multiply by $K/2$, and for applying the thus-obtained value $\zeta\nu K/2$, to said second main storage device;
(c) third means for thereafter applying the output of said second main storage device to said first controlled multiplier, for causing the same to multiply by $-K$, and for applying the output of said first controlled multiplier to said first main storage device;
(d) fourth means for thereafter applying the output of said first main storage device to said first output storage device; and
(e) fifth means for thereafter applying the value $\eta\nu+(\zeta\nu-\eta\nu K/2)K$ appearing at the output of said first output storage device to said first output adder, and for also applying to said first output adder the coordinate $x_M$ of the center of said circular curve portion, whereby there appears at the output of said first output adder the coordinate $x_{\nu+1}$.

2. A computer as defined in claim 1, further comprising a second output adder as well as:
(f) sixth means for thereafter clearing the values contained in said first and second main storage devices and for transferring the value $\eta\nu$ contained in said second auxiliary storage device to said second main storage device;
(g) seventh means for thereafter applying the output value $\eta\nu$ of said second main storage device to said first controlled multiplier, for causing the same to multiply by $-K/2$, and for applying the thus-obtained output value $-\eta\nu K/2$, of said first controlled multiplier to said first main storage device;
(h) eighth means for thereafter applying the output of said first main storage device to said second multiplier, for causing the same to multiply by K, and for applying the thus-obtained value $(\zeta\nu-\eta\nu K/2)K$ to said second main storage device;
(i) ninth means for thereafter applying the output $\eta\nu+(\zeta\nu-\eta\nu K/2)K$ of said second main storage device to said second output storage device; and
(j) tenth means for thereafter applying said value $\eta\nu+(\zeta\nu-\eta\nu K/2)K$ appearing at the output of said second output storage device to said second output adder, and for also applying to said second output adder the coordinate $y_M$ of the center of said circular curve portion, whereby these appears at the output of said second output adder the coordinate $y_{\nu+1}$.

3. A computer as defined in claim 2 wherein said sixth through tenth means, inclusive, are effective ahead of said first through fifth means, inclusive.

4. A digital computer for computing the coordinates $x_\nu$, $y_\nu$, of points $P_\nu$ along a circular curve portion having a known starting point $P_A$, end point $P_E$ and center $P_M$, the coordinates of which center point $P_M$ are $x_M$, $y_M$, said computer calculating said coordinates in accordance with the following equations:

$$x_\nu=x_M+\zeta\nu=x_M+\zeta_A-\sum_0^{\nu-1}\left(\eta\nu+\zeta\nu\frac{K}{2}\right)K$$

$$y_\nu=y_M+\eta\nu=y_M+\eta_A+\sum_0^{\nu-1}\left(\zeta\nu+\eta\nu\frac{K}{2}\right)K$$

wherein $\zeta$, $\eta$, is a coordinate system having as its origin said point $P_M$, wherein $\zeta_A$, $\eta_A$, are the coordinates of said starting point $P_A$ in said coordinate system $\zeta$, $\eta$, wherein $\zeta\nu$, $\eta\nu$, are the coordinates of the points $P_\nu$ in said coordinate system $\zeta$, $\eta$, and wherein K is a multiplying factor, said computer comprising, in combination:

(1) a first input adder;
(2) a second input adder;
(3) a first controlled multiplier for multiplying by the factor $-K$ or $-K/2$;
(4) a second controlled multiplier for multiplying by the factor K or $K/2$;
(5) a first main storage device;
(6) a second main storage device;
(7) a first auxiliary storage device;
(8) a second auxiliary storage device;
(9) a first output adder;
(10) a first output storage device; and
(11) a second output storage device, said computer further comprising:
(a) first means for applying the coordinates $\zeta\nu$, $\eta\nu$, of a previous point and stored in said first and second output storage devices to said first and second input adders, respectively, for applying to said first and second input adders the coordinate values $x_M$ and $y_M$, respectively, and for applying the output values $\zeta\nu+x_M$ and $\eta\nu+y_M$ to said first and second main storage devices, respectively, as well as to said first and second auxiliary storage devices;
(b) second means for thereafter applying the output of said first main storage device to said second controlled multiplier, for causing the same to multiply by $K/2$, and for applying the thus-obtained value to said second main storage device;
(c) third means for thereafter applying the output of said second main storage device to said first controlled multiplier, for causing the same to multiply by $-K$, and for applying the output of said first controlled multiplier to said first main storage device;
(d) fourth means for thereafter applying the output of said first main storage device to said first output adder and for also applying to said first output adder the coordinate $x_M$ of the center of said circular curve portion; and
(e) fifth means for thereafter applying the output of said first adder to said first output storage device, whereby there appears at the output of said first output storage device the coordinate $x_{\nu+1}$.

5. A computer as defined in claim 4, further comprising a second output adder as well as:
(f) sixth means for thereafter clearing the values contained in said first and second main storage devices and for transferring the value $\eta\nu+y_M$ to said second main storage device;
(g) seventh means for thereafter applying the output of said second main storage device to said first controlled multiplier, for causing the same to multiply by $-K/2$, and for applying the thus-obtained value of said first controlled multiplier to said first main storage device;
(h) eighth means for thereafter applying the output of said first main storage device to said second multiplier, for causing the same to multiply by K, and for applying the thus-obtained value to said second main storage device;
(i) ninth means for thereafter applying the output of said second main storage device to said second output adder and for also applying to said second output adder the coordinate $y_M$ of the center of said circular curve portion; and
(j) tenth means for thereafter applying the output of said second output adder to said second output storage device, whereby there appears at the output of said second output storage device the coordinate $y_{\nu+1}$.

6. A computer as defined in claim 5 wherein said sixth through tenth means, inclusive, are effective ahead of said first through fifth means, inclusive.

7. A digital computer for computing the coordinates $x_\nu$, $y_\nu$, of points $P_\nu$ along a circular curve portion having a known starting point $P_A$, end point $P_E$ and center $P_M$, the coordinates of which center point $P_M$ are $x_M$, $y_M$, said computer calculating said coordinates in accordance with the following equations:

$$x_\nu = x_M + \xi_\nu = x_M + \xi_A - \sum_0^{\nu-1}\left(\eta_\nu + \xi_\nu \frac{K}{2}\right)K$$

$$y_\nu = y_M + \eta_\nu = y_M + \eta_A + \sum_0^{\nu-1}\left(\xi_\nu + \eta_\nu \frac{K}{2}\right)K$$

wherein $\xi$, $\eta$, is a coordinate system having as its origin said point, $P_M$, wherein $\xi_A$, $\eta_A$, are the coordinates of said starting point $P_A$ in said coordinate system $\xi$, $\eta$, wherein $\xi_\nu$, $\eta_\nu$, are the coordinates of the points $P_\nu$ in said coordinate system $\xi$, $\eta$, and wherein K is a multiplying factor, said computer comprising, in combination:

(1) a first controlled multiplier for multiplying by the factor $-K$ or $-K/2$;
(2) a second controlled multiplier for multiplying by the factor K or $K/2$;
(3) a first main storage device;
(4) a second main storage device;
(5) a first auxiliary storage device;
(6) a second auxiliary storage device;
(7) a first value adder;
(8) a second value adder;
(9) a first output storage device;
(10) a second output storage device; and
(11) a first output adder;

said computer further comprising:

(a) first means for applying the coordinates $\xi_\nu$, $\eta_\nu$, of a previous point and stored in said first and second output storage devices to said first and second main storage devices, respectively, as well as to said first and second auxiliary storage devices, respectively;

(b) second means for thereafter applying the output of said first main storage device to said second controlled multiplier, for causing the same to multiply by $K/2$, for applying the thus-obtained value $\xi_\nu K/2$, to said second value adder, for applying the output of said second auxiliary storage device to said second value adder, and for applying the thus-obtained valve $\eta_\nu + \xi_\nu K/2$, to said second main storage device;

(c) third means for thereafter applying the output of said second main storage device to said first controlled multiplier, for causing the same to multiply by $-K$, for applying the output of said first controlled multiplier to said first value adder, for applying the output of said first auxiliary storage device to said first value adder, and for applying the thus-obtained value $\eta_\nu + (\xi_\nu - \eta_\nu K/2)K$ to said first main storage device;

(d) fourth means for thereafter applying the output of said first main storage device to said first output storage device; and (e) fifth means for thereafter applying the value $\eta_\nu + (\xi_\nu - \eta_\nu K/2)K$ appearing at the output of said first output storage device to said first output adder, and for also applying to said first output adder the coordinate $x_M$ of the center of said circular curve portion, whereby there appears at the output of said first output adder the coordinate $x_{\nu+1}$.

8. A computer as defined in claim 4, further comprising a second output adder as well as:

(f) sixth means for thereafter clearing the values contained in said first and second main storage devices and for transferring the value $\eta_\nu$ contained in said second auxiliary storage device to said second main storage device;

(g) seventh means for thereafter applying the output value $\eta_\nu$ of said second main storage device to said first controlled multiplier, for causing the same to multiply by $-K/2$, for applying the thus-obtained output value $-\eta_\nu K/2$, of said first controlled multiplier to said first value adder, for applying the output value $\xi_\nu$ of said first auxiliary storage device to said first value adder, and for applying the thus-obtained value $\xi_\nu - \eta_\nu K/2$ to said first main storage device;

(h) eighth means for thereafter applying the output of said first main storage device to said second multiplier, for causing the same to multiply by K, for applying the thus-obtained value $(\xi_\nu - \eta_\nu K/2)K$ to said second value adder, for applying the value $\eta_\nu$ from the output of said second auxiliary storage device to said second value adder, and for applying the thus-obtained value $\eta_\nu + (\xi_\nu - \eta_\nu K/2)K$ to said second main storage device;

(i) ninth means for thereafter applying the output $\eta_\nu + (\xi_\nu - \eta_\nu K/2)K$ of said second main storage device to said second output storage device; and (j) tenth means for thereafter applying said value $\eta_\nu + (\xi_\nu - \eta_\nu K/2)K$ appearing at the output of said second output storage device to said second output adder, and for also applying to said second output adder the coordinate $y_M$ of the center of said circular curve portion, whereby there appears at the output of said second output adder the coordinate $y_{\nu+1}$.

References Cited by the Examiner
UNITED STATES PATENTS

| | | | |
|---|---|---|---|
| 2,428,811 | 10/1947 | Rajchman | 235—164 |
| 2,866,506 | 12/1958 | Heirath et al. | 235—164 X |
| 3,109,092 | 10/1963 | Lott et al. | 235—151 X |

OTHER REFERENCES

Bendix Industrial Controls, Numerical Control Systems; The Bendix Corp. Industrial Controls Section, 21820 Wyoming, Detroit 37, Mich.

Ross, APT Part Programmer's Manual, vol. 2, Servomechanism Laboratory, Dept. of Elect. Eng. MIT, T J 1189 M37.

MALCOLM A. MORRISON, *Primary Examiner.*